United States Patent [19]

Abernathy

[11] Patent Number: 4,963,742

[45] Date of Patent: Oct. 16, 1990

[54] LEAK DETECTION AND MULTISPECTRAL SURVEY SYSTEM

[76] Inventor: Donald A. Abernathy, 2505 Wilkinson Rd., Sarasota, Fla. 33581

[21] Appl. No.: 423,624

[22] Filed: Oct. 18, 1989

Related U.S. Application Data

[63] Continuation of Ser. No. 250,981, Sep. 26, 1988, abandoned, which is a continuation of Ser. No. 28,471, Mar. 20, 1987, abandoned.

[51] Int. Cl.$^5$ ............................................. G01N 21/35
[52] U.S. Cl. .................................. 250/338.5; 250/339
[58] Field of Search ...................... 250/338.5, 342, 253, 250/339; 374/124

[56] References Cited

U.S. PATENT DOCUMENTS

| | | | |
|---|---|---|---|
| 3,032,655 | 5/1962 | Romans | 250/338.5 |
| 3,043,908 | 7/1962 | Madsen | 250/253 |
| 3,076,961 | 2/1963 | Bibbero | 250/342 |
| 3,278,746 | 10/1966 | Fiat | 250/253 |
| 4,343,182 | 8/1982 | Pompei | 374/124 |
| 4,420,265 | 12/1983 | Everest et al. | 374/124 |
| 4,421,981 | 12/1983 | Hough | 250/253 |
| 4,543,481 | 9/1985 | Zwick | 250/338.5 |

Primary Examiner—Carolyn E. Fields
Attorney, Agent, or Firm—Barnes & Thornburg

[57] ABSTRACT

Infrared scanning equipment and video cameras are used in an airborne survey of a pipeline while recordings are made of the information collected. Simultaneously, information is recorded to identify the locations of the collected information. The recorded IR tapes are then examined for portions containing temperatures which exceed established threshold temperatures. These extrathreshold temperature areas are then examined in the comparable visual tapes for reasons other than pipeline leaks to account for the anomalies. Other available information pertaining to the pipeline may also be referred to for posible explanations. Those areas for which analysis provides no explanation are then visited to repair leaks or find nonleak explanations. A record is made for future use which identifies all areas having explained anomalies in order to avoid the need for future repeat visits to these areas.

12 Claims, 2 Drawing Sheets

LEAK DETECTION AND MULTISPECTRAL SURVEY SYSTEM

This application is a continuation of application Ser. No. 250981 filed Sept. 26, 1988, now abandoned, which is a continuation of application Ser. No. 028,471 filed Mar. 20, 1987 now abandoned.

BACKGROUND OF THE INVENTION

1. Field of the Invention

This invention relates generally to leak detection and multispectral survey systems, and more particularly to a system of this type using airborne information gathering equipment.

2. Description of Related Art

The potential dangers to people and the environment from gas and hazardous liquid pipelines have induced the passage of federal, state and other regulations requiring periodic inspections of these lines for the detection of leaks. Prudent managers of such pipelines have set up even more stringent inspection requirements. The extensive use of such pipelines and the remote locations of the lines have stimulated investigations into techniques for more rapid and economical identifications of leaks.

In the case of a substantial leak of an above ground pipeline in a densely vegetated area, detection may be readily performed by visual observation from an aircraft. Smaller leaks from under ground pipelines, particularly in locations having little or no vegetation, present a more difficult detection problem.

The present invention utilizes information gathered by airborne sensors and cameras flown along a pipeline, to detect leaks of above ground or buried pipelines, regardless of the presence of vegetation.

It is therefore an object of this invention to provide a system having airborne sensors for detecting leaks in pipelines.

It is a further object of this invention to provide such a system using sensors which are sensitive to selected bands of the electromagnetic spectrum.

In accordance with these and other objects, which will become apparent hereafter, the instant invention will now be described with reference to the accompanying drawings.

SUMMARY OF THE INVENTION

Instrumentation is flown along a pipeline to be surveyed for leaks. Infrared detectors are used to obtain information about emitted radiation and also reflected solar radiation in some cases. In addition, video cameras are used to simultaneously collect visual images of the same terrain. After the airborne survey is completed, the recorded information is played back and anomalies in the infrared recordings identified. The comparable video recordings of the same terrain are used to provide reasons for the anomalies where possible. Those anomalies which cannot be explained by recorded information are investigated in on site inspections. Any additional nonleak caused explanations are also noted. The resulting record permits subsequent airborne surveys which more precisely locate likely leaks and avoids investigations of areas previously found to have produced temperature anomalies for other reasons. An important aspect of the process is the identification of the ground location relating to the various parts of the recorded images so that workers and equipment can locate the leaks readily.

DETAILED DESCRIPTION OF THE INVENTION

Figure 1:
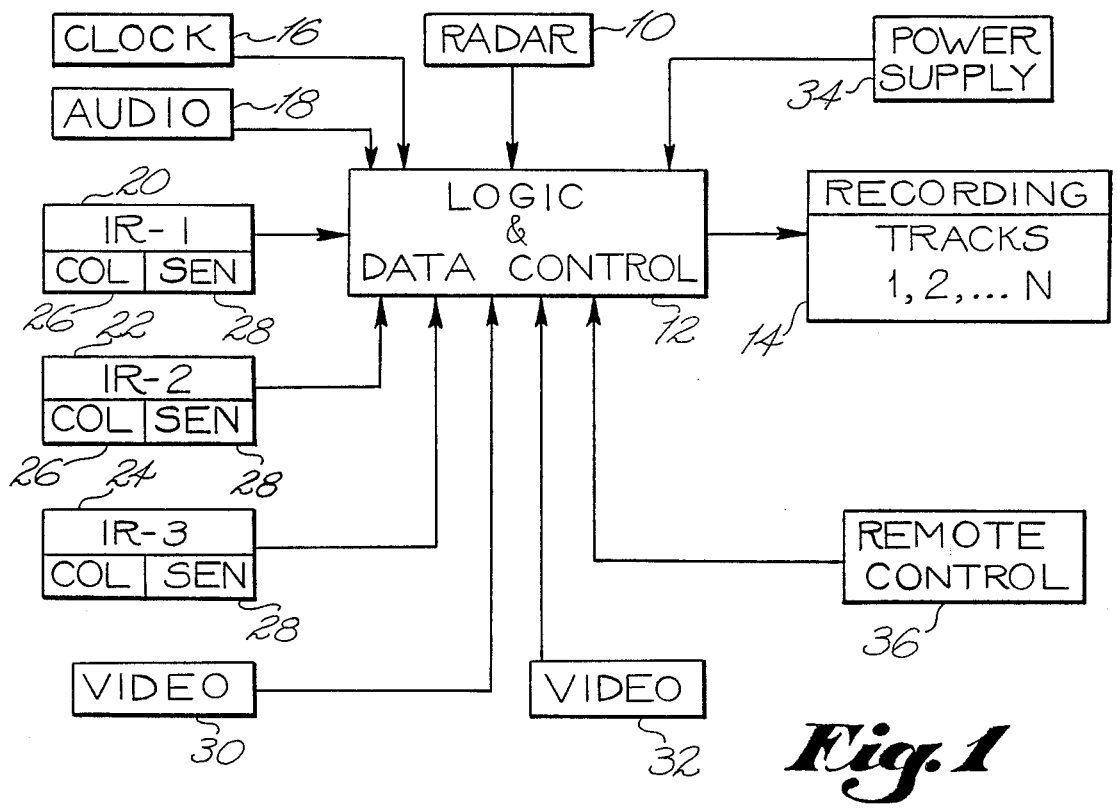
FIG. 1 is a block diagram representing the airborne sensor system.

Referring to FIG. 1, the components of the system which are carried in an aircraft are depicted. It is intended that a small aircraft carrying only the pilot and an equipment operator be needed to perform the pipeline inspections. Most of the equipment will be carried in the cargo area of the aircraft so that remote controls for the equipment operator are provided.

Radar 10 is operated to give continuous data reflecting the aircraft speed and elevation above the ground. A Doppler radar is used which will provide ground speed and height above ground level in a digitized form several times a second. The aircraft is typically flown at a constant elevation above sea level. The radar data is fed to logic and data control 12 which directs it to a track of recording apparatus 14. Recording apparatus 14 may be a single recording device with multiple recording tracks, or may constitute a plurality of recorders. For the purposes of this invention it is desirable to relate all of the recording tracks to a single time interval. Clock 16 provides regular time signals to logic and data control 12 which causes them to be recorded on each of the recording tracks of recording apparatus 14, thereby providing a common frame of reference. These time signals also enable the user to relate the information recorded during the flight survey to information from other sources, such as the type of product being carried in the pipeline and the fittings, etc. in place on the pipeline at the time the survey was carried out. Audio input 18 may be used to add cues orally to one of the recording tracks. These cues may identify cultural and terrain features at the time the aircraft is passing over them so that all recorded data may readily be related to an aircraft sectional map or the like.

In addition to the radar data being collected and recorded, radiation from selected bands of the electromagnetic spectrum is collected and recorded. Representative of these bands are Bands 1-3 identified as 20-24 in FIG. 1. Each band includes a collector 26, which in this case is a lens having a selected field of view, and a sensor 28, which is sensitive to a particular band of radiation and produces electrical signals having intensities proportional to the collected radiation. The signals produced by sensors 28 are fed to logic and data control 12 and then to recording apparatus 14, where they are recorded on separate tracks.

Video cameras 30 and 32 are also provided. Video camera 30 is equipped with a wide field of view lens and video camera 32 has a more limited field of view.

The apparatus of FIG. 1 further includes power supply 34 to permit operation of the equipment without depending upon the power supply of the aircraft. Remote control 36 is used to turn the various components of the apparatus on and off. As previously referred to, typically part of the equipment will be located beyond the reach of the operator once the aircraft takes off. The display provided by the face of remote control 36 may merely indicate whether each of the components is in proper operational status, i.e. on and running, or off.

One region of the electromagnetic spectrum which is of particular interest with respect to this invention is the infrared which extends, roughly, from a wavelength of one micrometer to one thousand micrometers. The infrared radiation of interest is of two types, one type is that which is emitted by the terrain and objects on the terrain which results from their temperatures. The other type is reflected solar infrared radiation. Atmospheric absorption severely attenuates bands of solar radiation leaving adjacent bands, which are sometimes called atmospheric windows, of relatively high intensity radiation. With respect to the present invention, solar radiation from one or more of these high intensity infrared bands, which is reflected by the surface of the terrain below the aircraft is sensed. When images corresponding to the radiation of these two types are separately displayed, for example on a black and white video displays as shades of gray, two different images will result. This is because the absolute temperature of a body of water, for example, may be the coldest part of the imaged terrain, but it may also be the best reflector of solar radiation within the field of view of the collectors. This distinction is useful in interpretation of the images in identifying possible leaks.

The manner in which the recorded information is used in the detection of pipeline leaks will be briefly considered now. An infrared recording may be displayed which represents the temperatures of the terrain which falls within the field of view of the lens. The display will present these temperatures in the format which is chosen by the operator. As an example, a black and white cathode ray tube may be programmed to display the high temperature as white and the low temperature as black, with intermediate temperatures as shades of gray. The "high" temperature is the high temperature within the frame of the recording being displayed. For each frame, therefore, a high and low temperature will be identified, an average of these temperatures calculated, and the temperatures of all the points (picture elements or pixels) may then be considered as deviations from this average.

If for no other reason, the presence of the pipeline within the frame, even if buried, will result in a range of temperatures being displayed. In addition to the pipeline, however, the frame will include other objects which will have temperatures which deviate from the background soil temperature. Thus terrain features such as vegetation, streams, rock outcroppings, etc., and cultural features such as roads, buildings, etc. will display different temperatures in the frame. Moreover, additional temperature variations will result from the presence in the frame of a cow or the like, which may be a transitory object. Because the temperature within a frame will normally vary to some extent, it becomes desirable to focus only upon the more extreme deviations from the average.

The cause of the more extreme temperature variations may not be apparent from the displayed IR recording. Because the IR recording has been made simultaneously with other recordings which can be used to identify the location of the area producing a temperature extreme, it would be possible to make a listing of the location of all such temperature extremes, and to go to those locations to determine whether the extreme temperature has been caused by a leak or is the result of some other cause. An important part of this system, however, is the minimization of the number of locations which need be visited by using other means to identify the temperature deviation causes when possible. The additional recorded information is used to eliminate from the list those locations for which a cause for the temperature deviation can be identified.

The video recording made from video camera 32 having a more limited field of view will typically have the same field of view as the infrared collectors. This video recording, which was made simultaneously with the IR recording is played synchronously with the IR recording. This video display will frequently show a cause for the extreme temperature deviation. The video recording made from video camera 30, having a wide field of view, is useful in determining the precise location of any suspected leak.

Figure 2:
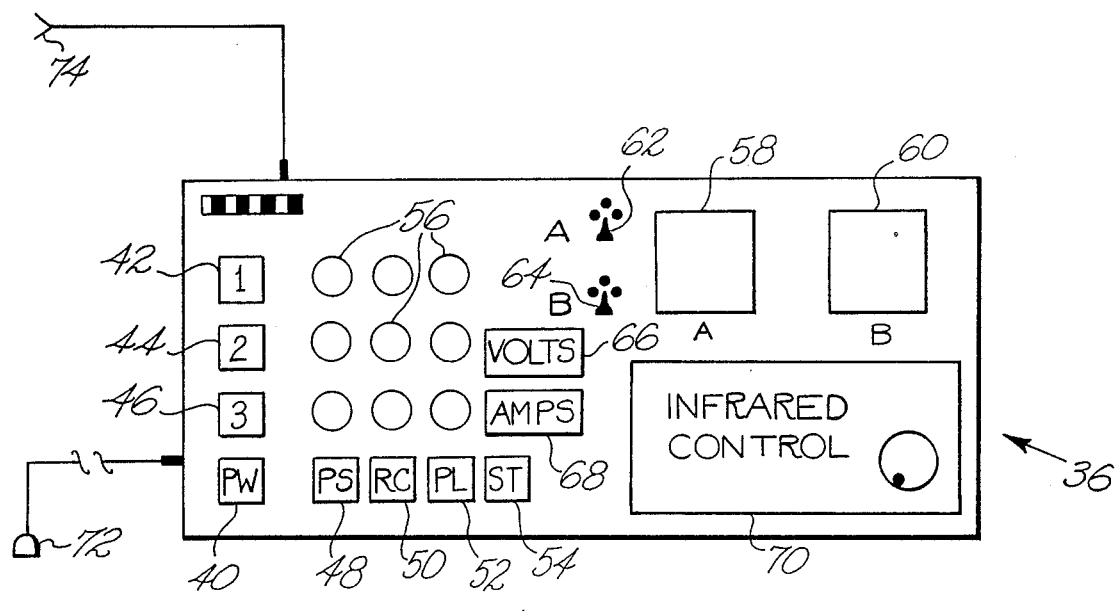
FIG. 2 is a representation of the control board of the remote control for the airborne sensor system.

Turning now to FIG. 2, remote control unit 36 of FIG. 1 will be described. Power switch 40 is used to turn on power supply 34 (FIG. 1) which will provide power to the IR scanners, video cameras and recording equipment. For the purposes of the present discussion assume that three video tape recorders (VTRs) comprise the recording equipment for the survey system. The power switches provided on the VTRs are left in the on position. Back lighted power switches 42–46 permit any or all of the VTRs to be separately powered with the lights providing a visual indication to the operator of the VTRs being used. Back lighted mode switches 48-54, permit the operating VTRs to be placed in the PAUSE, RECORD and STOP modes. These switches are operably connected to control analogous switches on the individual VTRs. (PLAY is not used as such, but to place the VTRs in the RECORD mode by simultaneously pressing RECORD and PLAY.) Indicator lights 56 give the operator information as to the mode the VTRs are in. Typically, before the survey flight each VTR will have a new tape installed for recording. When the pipeline is to be surveyed, power switch 40 will be turned on and all VTRs will be operated. At the same time, video cameras and IR scanners will begin operating.

Monitors 58 and 60, labeled "A" and "B" respectively, permit the operator to observe the signals being recorded. Liquid crystal displays may be used for this purpose. Selector switches 62 and 64 permit either monitor to display the signals being recorded by any VTR.

The condition of the power supply voltage and current is provided by digital displays 66 and 68.

Infrared control system 70 is the Inframetrics Corporation remote controller for the Model 600 scanner. This control system permits the adjustment of the range of the frequency spectrum to be scanned and the average temperature about which extreme temperature deviations are to be recorded.

Remote control 36 is also provided with an audio input from throat microphone 72 and connection 74 for the aircraft intercom.

Figure 3:
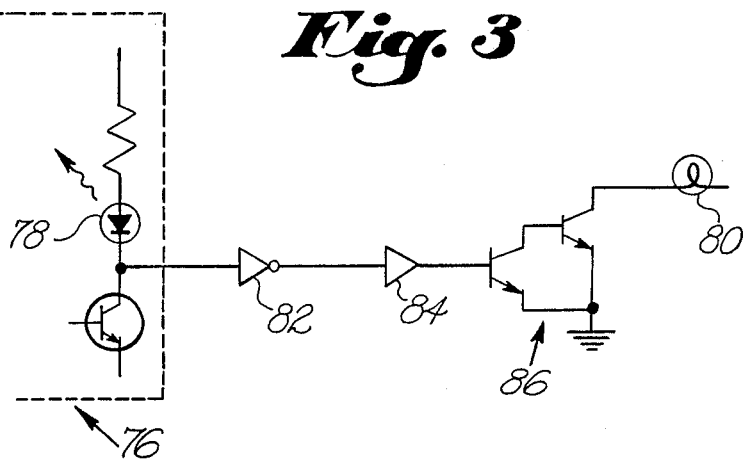
FIG. 3 is a schematic showing a circuit for controlling an indicator light on the remote control to correspond with the status light on a video tape recorder.

Commercially available video tape recorders are utilized in this system and are modified to enable the remote control operation. As shown in FIG. 3, video tape recorder detail 76 includes a status light 78, which in this case is a light emitting diode. A connection is made as shown between this light and the appropriate indicator light 80 which would be one of the indicator lights 56 of FIG. 2. Buffer 82, amplifier 84 and Darlington driver 86 provide the necessary buffering and amplification to drive light 80. This arrangement will cause indicator lights on remote control 36 to be "on" or "off" when the corresponding lights on the VTRs are so switched.

Figure 4:
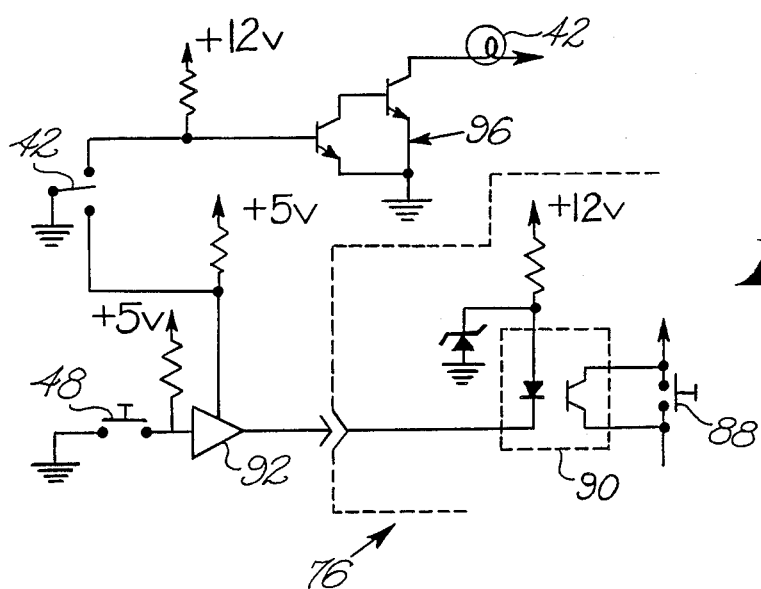
FIG. 4 is a schematic showing a circuit for controlling a switch on a video tape recorder by a switch on the remote control.

It is also necessary to be able to cause a change in the mode of operation of a VTR from remote control 36. Referring to FIG. 4, switch 88 represents an existing mode control switch on a video tape recorder. Isolation circuit 90 permits a control signal to be sent to open or close switch 88 from the remote control of FIG. 2. An enable switch such switch 42 of FIG. 2, and a function switch such as switch 48 of FIG. 2 are closed. This causes a control signal to be sent through buffer to isolation circuit 90 and the VTR. A connection is also made through Darlington circuit 94 to the lamp 96 which provides the backup light for switch 42.

In operation, a survey aircraft is flown at a constant altitude above sea level along the pipeline to be surveyed. The infrared scanner(s) and video cameras are directed at the pipeline and synchronized recordings are made of the signals from these devices. In addition, speed and height above ground data from the Doppler radar are recorded along with audio and clock information. This recorded information along with other available records such as topographic maps and pipeline plans are then made available for analysis. This analysis is performed by simultaneously playing IR and video recordings. The IR record of emitted radiation is used to identify an average temperature of the terrain. Upper and lower limits may be set as threshold temperatures within which normal temperatures exist which do not require any further attention. Extrathreshold temperatures represent anomalies which may be caused by a leak or have some other cause. Such extrathreshold temperatures may be identified by a software program, or by observation. With respect to each such anomaly, an attempt is made to identify the cause by using the additional information which has been recorded in the survey or previously recorded and assembled for the analysis. This identification process is necessary because a temperature which is characteristic of a leak may also have a nonleak cause. For example, a leak of liquid will produce a low temperature area in the emitted IR image, but a similar low temperature area may result from a pond of water. Such a pond of water will act as a good reflector of solar radiation permitting its identification by an IR sensor sensitive to radiation in a band which is readily passed through the atmosphere such as about 10 microns. Alternatively or additionally a visible image may be used in identifying the reason for the anomaly.

The foregoing procedure will reduce the number of anomalies, but it may not provide known causes for all anomalies. An on site investigation of the remaining anomalies is then performed. The information which has been collected not only identifies anomalies, but it also provides means for pinpointing the locations which must be visited. A wide field of view visual image contemporaneously recorded with the other images aids in this locating process, and also provides an indication of right of way intrusions or infringements. (The terms "wide field of view" and "narrow field of view" are relative. It has been found useful to have the narrow field of view correspond roughly to the pipeline right of way. The wide field of view may be one half mile centered about the pipeline.) The recorded time at which the image was produced in conjunction with aircraft speed and latitude and longitude coordinates provided by the radar give additional information. Oral cues recorded during the aerial survey also aide in the location. Such oral cues will be more informative where landmarks are readily identified, while techniques based on elapsed time may be necessary where the terrain is generally similar for long distances.

An on site investigation will identify additional areas which have causes other than leaks for the temperature anomalies. All such areas are incorporated into the descriptive data pertaining to the pipeline. At the conclusion of the first aerial survey a description of the pipeline and the surrounding terrain is prepared which includes the infrared and visual images along its length, together with the topographic information and other pertinent data. This other pertinent data will include identified causes of anomalies which will show up in subsequent aerial surveys. In general, even with a change of seasons and ambient temperatures, a temperature deviation in excess of the threshold set will likely show up in a subsequent survey. Because these known reasons are now identified, only additional or new anomalies (likely to be leaks) need be given an on site investigation.

Figure 5:
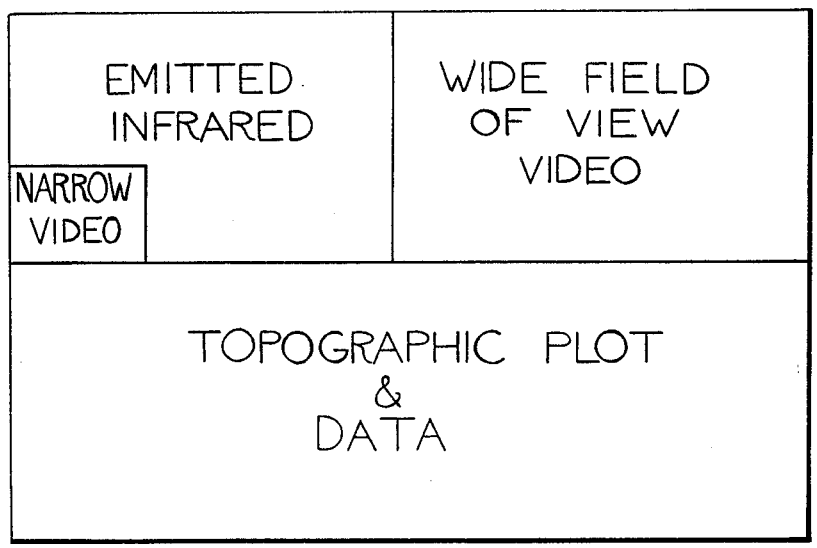
FIG. 5 represents a format for displaying survey results.

FIG. 5 shows a preferred form of pipeline description which can be recorded on a single video tape and presents in composite form the aerial survey visual and IR images, together with the topographic plot on which additional data may be noted. This tape provides a reference which is displayed at the same time a newly recorded emitted IR recording is displayed permitting rapid identification of anomalies as being either previously identified or new. A list of new anomalies and their locations can then be rapidly prepared and work crews sent to these locations.

Because federal and other laws require such inspections periodically, the leak detection and multispectral survey system of this invention provides an economical manner to comply with these laws.

While the instant invention has been shown and described herein in what is conceived to be the most practical and preferred embodiment, it is recognized that departures may be made therefrom within the scope of the invention, which is therefore not to be limited to the details disclosed herein, but is to be afforded the full scope of the claims so as to embrace any and all equivalent apparatus and articles.

I claim:

1. A multispectral survey system comprising:
 first sensor means for producing an electric signal representative of the intensity of radiation received in a first band of the electromagnetic spectrum;
 first radiation collection means for collecting electromagnetic radiation from a first selected field of view and delivering it to said first sensor means;
 first recording means for receiving and recording said electric signals produced by said first sensor means;
 first video camera means having a field of view substantially the same as said first selected field of view for producing electric signals representative of the visible radiation received from said first field of view;
 second recording means for receiving and recording said electric signals produced by said first video camera means;

second video camera means having a field of view wider than said first selected field of view for producing electric signals representative of the visible radiation received from said second field of view;

third recording means for receiving and recording said electric signals produced by said second video camera means; and synchronizing means for synchronizing the recording of signals produced by said first sensor means and said first and second video camera means.

2. A multispectral survey system in accordance with claim 1 further including:

timing means for producing time signals;

said timing means connected to provide said time signals to each of said recording means.

3. A multispectral survey system in accordance with claim 1 further including:

radar means for producing signals representative of distance above ground, speed and latitude and longitude coordinates;

said radar means connected to provide said signals representative of distance above ground, speed and latitude and longitude coordinates to one of said recording means.

4. A multispectral survey system in accordance with claim 1 further including:

audio means for delivery of oral data to one of said recording means.

5. A multispectral survey system in accordance with claim 1 further including:

display means for indicating the operation of said survey system.

6. A multispectral survey system in accordance with claim 1 further including:

second sensor means for producing an electric signal representative of the intensity of radiation received in a second band of the electromagnetic spectrum;

second radiation collection means for collecting electromagnetic radiation from said first selected field of view and delivering it to said second sensor means.

7. A multispectral survey system in accordance with claim 1 further including:

remote control means for controlling the modes of said recording means.

8. A multispectral survey system in accordance with claim 7 further including:

remote control means for adjusting the band width of said first sensor means.

9. A multispectral survey system comprising:

timing means for producing signals representative of time;

sensor means for producing an electric signal representative of the intensity of radiation received in an infrared band of the electromagnetic spectrum;

radiation collection means for collecting electromagnetic radiation from a selected field of view and delivering it to said sensor means;

first video camera means having a field of view substantially the same as said selected field of view for producing electric signals representative of the visible radiation received;

second video camera means having a field of view substantially wider than said selected field of view for producing electric signals representative of the visible radiation received;

radar means for producing signals descriptive of the location of the land mass in said selected field of view; and recording means for receiving and recording said signals produced by said timing means, said sensor means, said first and second video camera means and said radar means.

10. A multispectral survey system in accordance with claim 9 further including:

control means for controlling the operation of said sensor means, said first and second video cameras and said recording means; and means for displaying selected images represented by said produced signals.

11. A process for detecting leaks from a pipeline comprising:

recording simultaneously radiation received in at least a first band of the electromagnetic spectrum and two different visual images along a flight path including the pipeline;

identifying in the recorded electromagnetic spectral radiation, locations containing temperatures which are extrathreshold;

examining locations in the recorded visual images corresponding to the identified locations in the recorded electromagnetic spectral radiation to determine nonleak causes of the extrathreshold temperatures;

listing locations for which causes of the extrathreshold temperatures have not been determined; and performing an on site inspection of the listed locations to identify the causes of the extrathreshold temperatures.

12. A process in accordance with claim 11 further including:

preparing a record of the pipeline including identification of extrathreshold temperature locations.

* * * * *